(12) United States Patent
Kossmann et al.

(10) Patent No.: US 9,656,391 B2
(45) Date of Patent: May 23, 2017

(54) ROBOTIC END EFFECTOR FOR PLUG INSTALLATION

(71) Applicant: Bayerische Motoren Werke Aktiengesellschaft, Munich (DE)

(72) Inventors: Max Kossmann, Munich (DE); Johannes Bix, Munich (DE); Steve Williams, III, Greenville, SC (US); Braden Ross Nichols, Greenville, SC (US); Caitlin Elizabeth Browning, Houston, TX (US); Amelia Faith Campbell, The Woodlands, TX (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 232 days.

(21) Appl. No.: 14/464,206

(22) Filed: Aug. 20, 2014

(65) Prior Publication Data

US 2016/0052134 A1  Feb. 25, 2016

(51) Int. Cl.
  *B23P 19/00*  (2006.01)
  *B25J 9/16*  (2006.01)
  *B25J 15/00*  (2006.01)

(52) U.S. Cl.
  CPC ............ *B25J 9/1687* (2013.01); *B23P 19/001* (2013.01); *B25J 15/0019* (2013.01); *Y10S 901/41* (2013.01)

(58) Field of Classification Search
  CPC .... B25J 9/1687; B25J 15/0019; B23P 19/001; Y10T 29/53183
  See application file for complete search history.

(56) References Cited

U.S. PATENT DOCUMENTS

| | | | | |
|---|---|---|---|---|
| 4,205,433 A | * | 6/1980 | Araki | H05K 13/0452 227/85 |
| 6,317,973 B1 | * | 11/2001 | Kuriyama | H05K 13/04 29/564.1 |
| 2011/0182708 A1 | | 7/2011 | Baudisch et al. | |
| 2011/0209320 A1 | | 9/2011 | Connolly | |
| 2012/0330463 A1 | | 12/2012 | Schreiber et al. | |

FOREIGN PATENT DOCUMENTS

| | | |
|---|---|---|
| EP | 2 366 506 A2 | 9/2011 |
| GB | 1 399 924 | 7/1975 |
| JP | 11-151625 A | 6/1999 |
| JP | 2006-218615 A | 8/2006 |

OTHER PUBLICATIONS

European Search Report issued in counterpart European Application No. 15174410.9 dated Jan. 12, 2016 (nine (9) pages).

* cited by examiner

*Primary Examiner* — Richard Chang
(74) *Attorney, Agent, or Firm* — Crowell & Moring LLP

(57) ABSTRACT

A robot tool is provided for the placing of closing plugs in openings in a vehicle body component. The robot tool includes a placing device in which a plug magazine with a plurality of plugs is accommodated, which plugs can be placed by way of the placing device without reloading directly behind one another in the respective openings. A method is provided for the secure placing of the plugs.

8 Claims, 2 Drawing Sheets

ROBOTIC END EFFECTOR FOR PLUG INSTALLATION

BACKGROUND AND SUMMARY OF THE INVENTION

The invention relates to a robot tool for placing plugs in openings in a vehicle body component by means of a placing device. The invention further relates to a method for placing plugs in an opening in a vehicle body component while using the robot tool.

So that, in the case of vehicle body components, the liquid paint can rapidly flow out of the cavities after painting, these cavities are provided with numerous, sometimes up to several hundred openings. Holes also have to be provided for placing weld points. In addition, wax can also be injected into the cavities through these openings in order to seal the vehicle body component. All openings have to be closed again during the assembly in order to prevent the intrusion of moisture or water and to protect the vehicle from corrosion during operation. The openings are closed by means of so-called plugs made of plastic, which are available in different diameters. The plugs are usually inserted manually into the openings by employees.

This handling has various disadvantages. The work is unergonomic for the employee placing these plugs because he has to bend over and stretch in order the place the plugs. In addition, some force is required for pressing the plug into the respective opening, which is very strenuous in the long run. This may result in diminishing concentration and therefore in a greater susceptibility to making errors. Since, depending on the vehicle model, up to several hundred plugs are to be placed, distributed over the entire production range, these are always positioned by different employees at different stations. This requires many manipulations which have to be learned by numerous different employees with a considerable training duration.

Because of the different diameters of the plugs, there is the possibility that the latter may be placed incorrectly in individual cases. It can also not be excluded that, although the respective plug is placed in the correct position, it is not pressed into the vehicle body with sufficient force and therefore does not have a complete sealing effect or may even fall out during the drive. Individual plugs may also simply be forgotten. As a result, moisture or water can penetrate into the vehicle body and cause corrosion.

Finally, the openings are sharp-edged holes, which may injure the workers when they insert the plugs.

There are also robot-supported methods for inserting the plugs. However, in this case, only one plug respectively can be accommodated at the placing device of the robot tool. In addition, after the placing of each plug, the placing device has to be moved back to the reloading magazine. This results in a considerable loss of time.

Furthermore, the robot tool operates by means of a vacuum or compressed air and, in addition to the electrical connection, also requires an air supply. The providing of compressed air generally is very energy-intensive. As a result of the required use of compressed-air hoses, there is also the risk of getting caught in or stumbling over the latter, i.e. the risk of injury.

The previously used robot tools also have the disadvantage that they do not meet the MRK (Mensch-Roboter Kooperation)-HRC (Human-Robot Cooperation) requirements. The robot station is fenced in so that, while the plug is placed, no human being can work at the vehicle body component. A tool that meets the human-robot cooperation (HRC) requirements has to be designed correspondingly for lightweight robots of a power and force restriction according to the definition of DIN ISO Standard DIN ISO 10218, Part 1 & Part 2, in order to thereby permit a collaborating operation according to TS-15066. In this case, it is important that conceivable actuators of the tool present no danger.

It is also disadvantageous that the normally used vacuum head of the robot tool cannot be exchanged. Therefore, only a certain plug of a diameter matching the vacuum head can always be used. In addition, after the placing of the plug, it is assumed without checking that the plug fits. Should the plug not hold, moisture may penetrate, as described above.

It is therefore an object of the invention to provide a robot tool by means of which plugs can be placed in a more rapid and variable manner without a constant reloading. Furthermore, it is an object of the invention to provide a method by means of which the plugs can be placed by the robot tool in a faster and examinable manner while they are secured against a falling-out.

According to the invention, a robot tool is provided for placing plugs in openings in a vehicle body component by means of a placing device, on which a plug magazine is arranged which has a plurality of plugs arranged in a row directly behind one another that can be placed in the respective openings of the vehicle body component by means of the placing device without reloading. The integration of the plug magazine and of the placing device makes it possible to place a plurality of plugs behind one another, without the placing device having to repeatedly accommodate an individual plug. As a result of a precisely fitting guidance of the plugs in the plug magazine, a straight and ideally guided pushing-out is guaranteed.

In a preferred embodiment of the invention, it is further provided that successively the robot tool can be guided according to the HRC (human-robot cooperation) requirements and the placing device can be guided to the respective openings in order to place the plugs. The positioning can automatically take place in a camera-based manner or by means of other arbitrary methods known from the state of the art (such as a power-controlled positioning of the robot, a positioning by means of sensors (capacitively, proximity switch, light scanner, etc.)). In this case, the placing device is guided to the opening; the insertion of the plug takes place by machine power. As a result of the design that meets the HRC (human-robot cooperation) requirements, it also becomes possible that, in addition to the placing of plugs, simultaneously further work can be carried out on the vehicle body component and the placing of plugs can be integrated in further assembly operations.

In an advantageous embodiment, the invention further provides that the plugs can be pushed out of the plug magazine accommodated in the placing device, by way of an electric spindle drive in predefined steps, for example by using a spindle motor. As a result, it becomes possible to position the plugs before and during the placing operation in a precise manner in the opening with respect to the penetration depth. A preloading position for the better insertion of the plugs into the opening can also be ensured.

In an advantageous embodiment, the robot tool is further characterized in that, at its outlet, its placing device has a device for the at least partial bending-over of at least one elastic part of the plug, which, during the pushing-out from the placing device, affects the elastic part of the plug. In advantageous embodiments, such a device for the bending-over is designed as a lip surrounding the outlet of the placing device or as projections molded onto the outlet of the placing device.

The bending-over of a part of the elastic plug, for example, of a surrounding edge or of a lid, has the purpose of being able to exercise a tensioning force on the plug when it is set or placed in the opening. The plug usually has a surrounding holding lip (reaching-behind section), which reaches behind the opening edge in the placed state. As soon as this reaching-behind has been implemented, it should no longer be possible to release the plug from the opening. By means of the device for the bending-over, a tensile force is introduced at a second location at the plug during a pulling movement of the placing device, by means of which tensile force, the secure hold of the plug can be checked. When a certain amount of tension has been reached, the plug is pressed by way of the spindle drive completely out of the placing device, and the at least partially bent-over sections are elastically placed against the exterior wall of the opening.

According to the invention, in an embodiment, the placing device of the robot tool can be implemented to be exchangeable, so that different plugs can be placed in correspondingly different openings. Depending on the vehicle body and the opening, different plug sizes and plug constructions may be placed.

The invention also provides a method for placing the plugs in the opening in the vehicle body component by using the above-described robot tool and is characterized in that, by way of the spindle drive of the placing device, the plug to be placed is first pushed along a predetermined extent out of the outlet of the placing device, and the partially pushed-out plug is inserted by means of the placing device in the opening to be closed such that a part of the plug reaches behind the opening in a holding manner, and finally the plug is pushed out of the placing device, and the placing device is removed.

In this case, a process step is advantageous according to which, for inserting the plug, the placing device is held in a freely swinging manner, so that, by way of the swinging motion of the placing device and of the components connected therewith, the plug will independently position itself in the center with respect to the opening to be closed. In this case, it is advantageous for the plug to be conically constructed in the area to be introduced into the opening.

The method according to the invention has the further advantage that, before the placing device is removed, a check of a secure fastening of the plug is carried out in that the placing device exercises a tensile force upon the plug positioned in the opening. In a preferred embodiment of the method, the tensile force is generated by means of the device for the bending over constructed at the placing device and described in detail above. Subsequently, the next plug in the plug magazine will be fed. An exchange of magazines or a refilling of the magazine will take place only after all plugs of the magazine have been placed.

As a result of the use of the robot tool according to the invention and of the corresponding method, no human being has to carry out a movement that is ergonomically unfavorable for him. The expenditure of force for placing the plugs takes place by the machine. Because of the rapid placing operation, many different employees no longer have to be charged with placing the plugs. Training and planning time is saved, i.e. the time during which the employee is occupied with the installation at each vehicle. The inserting of the plugs by the robot takes place more rapidly than in the case of manual labor, whereby costs are saved. Furthermore, the robot will place the plugs always in the correct location independently of their diameters. Errors can thereby be reduced and the quality of the placing can be improved. Finally, the employee will no longer come in contact with the sharp-edged openings and can therefore no longer be injured at the latter.

In contrast to the previous robot-based tools, as a result of placing several plugs in a row in the plug magazine, it is no longer necessary to take up a new plug after each inserting operation. Time and costs can thereby be saved. By using the spindle drive and the elimination of the compressed-air vacuum mechanism, on the one hand, energy and costs are saved and, on the other hand, the compressed-air hoses also can be eliminated. This reduces the expenditures and the risk of injury.

As a result of the exchangeably designed placing device, the robot tool can be adapted to the respective requirement or the respective diameter of the plug. It is therefore universally usable.

The checking of the correct fit of the plug at the end of the placing operation excludes faults during the placing or an incorrectly placed plug, whereby the quality is improved.

The spindle motor (stepping motor) to be used, for example, permits an exact feeding motion or an exact positioning of the plug in the placing device or at its outlet.

All above-described characteristics can be freely combined if technically conceivable.

Other advantageous further developments of the invention are characterized in the subclaims or will be illustrated in detail in the following together with the description of the preferred embodiment of the invention by means of the figures.

DETAILED DESCRIPTION OF THE DRAWINGS

The figures are schematically illustrated examples. The same reference numbers indicate identical parts in all views.

Figure 1:
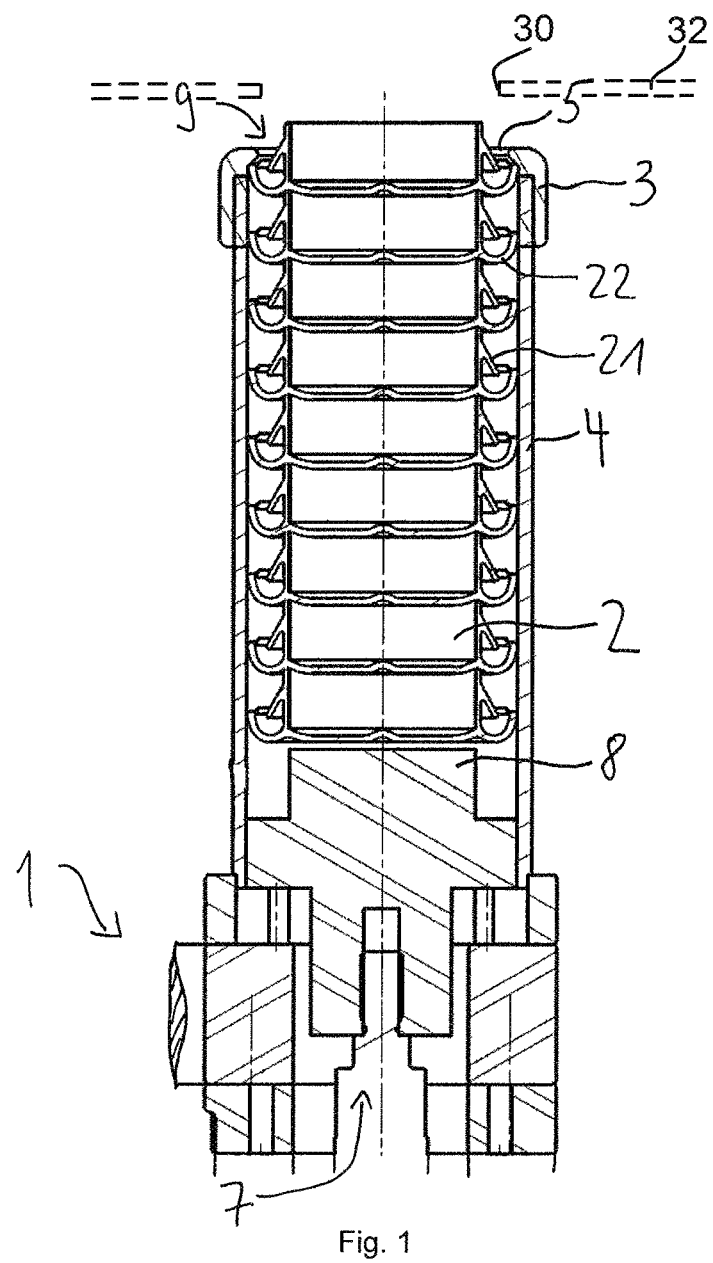
FIG. 1 is a sectional view of a part of a robot tool according to the invention.
Figure 3:
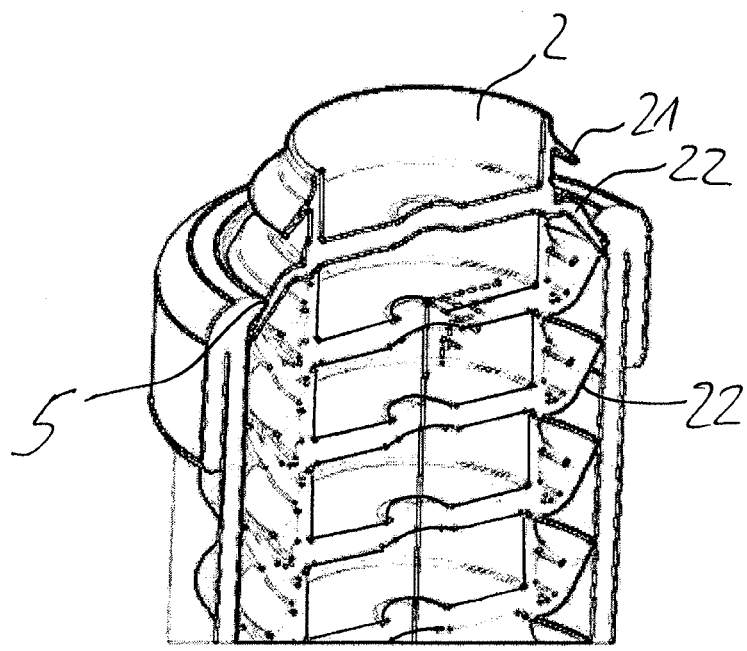
FIG. 3 is a perspective view of a second embodiment of a placing device of a robot tool arranged on a plug magazine in the preloading state.

FIG. 1 is a sectional view of a part of a robot tool 1 for placing plugs 2 in openings 30 in a motor vehicle body component 32 (only shown schematically in dashed lines). The robot tool 1 comprises a placing device 3, on which a plug magazine 4 is arranged which has a plurality of plugs 2 arranged therein in a row. The plugs 2 arranged in a row in the plug magazine 4 are pushed out of the outlet 9 in predefined steps by way of a carriage 8 that can be displaced in the longitudinal direction by a spindle drive 7, in order to ensure a precise positioning of the plugs 2 in the respective opening. The additional components of the spindle drive 7 are not illustrated. The robot tool 1 meets the MRK (human-robot cooperation) requirements and, for a partially automatic or manual operation, may have corresponding receiving devices for human control, which are not illustrated. As devices for the partial bending-over of an elastic lid 22 of the plug 2, the placing device 3 has a surrounding lip 5 at its outlet 9, which lip 5 is also illustrated in FIG. 3. The placing device 3 is interchangeably fastened, for example, screwed on, to the plug magazine 4 in a detachable manner. In the case of a corresponding type change, the lip 5 is also exchanged with the placing device 3 with respect to the corresponding diameter.

Figure 2:
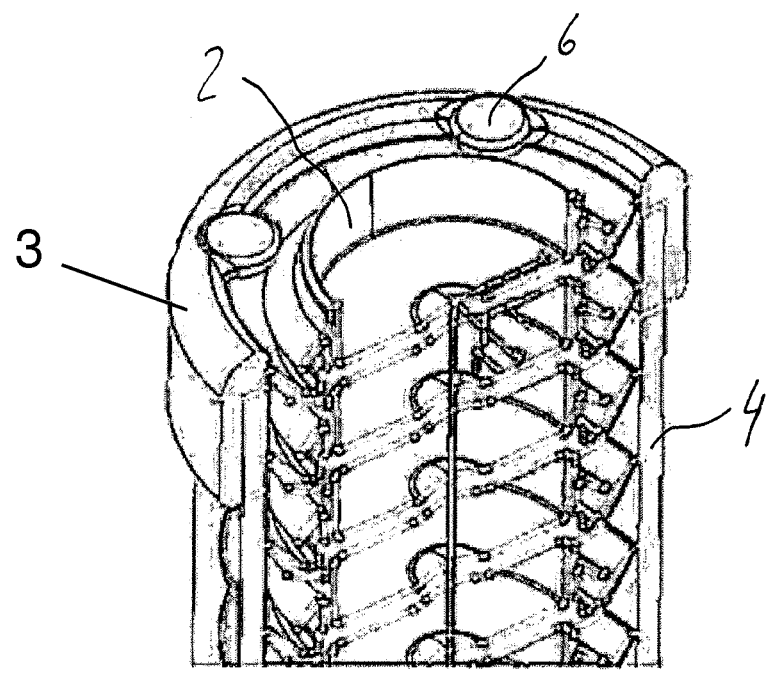
FIG. 2 is a perspective view of a first embodiment of a placing device of a robot tool arranged on a plug magazine.

FIG. 2 is a perspective view of a placing device 3 of a robot tool 1 arranged on the plug magazine 4, in which case, the device for the partial bending-over of the elastic lid 22 of the plug 2 is designed as projections 6 molded to the outlet 9 of the placing device 3. The projections 6, as well as the lip 5 in FIG. 3, project so far into the center of the placing device 3 that the section 21 of the plug that reaches behind the hole can pass through without any contact and can be introduced into the opening. As soon as the section 21, which reaches behind, i.e., reaches in a holding manner behind the opening in the wall, the entire tool with the placing device 3 is pulled back and, when the plug 2 is pushed out of the placing device 3, the lid 22 of the plug 2 is partially bent back by the advancing of the spindle drive 7. This bending-over generates a tensile force upon the plug 2, by means of which the secure hold of the plug 2 in the opening can be checked. As an alternative to the projections 6, FIG. 3 illustrates a surrounding lip 5 that produces the same technical effect. In FIG. 3, the lid 22 is partially bent back. To the extent that the section 21 that reaches behind would already reach behind the opening wall, the placing device 3 should already generate the tensile force in this state.

In the case of the method for placing the plug 2 in the opening in a vehicle body part, the carriage 8 is displaced in the longitudinal direction by way of the spindle drive 7, whereby the plugs 2 can be successively pushed out of the plug magazine 4 by the placing device 3. In a state pushed to a predetermined extent out of the outlet 9 of the placing device 3, for example, according to FIG. 3, the plug 2 is inserted into the opening to be closed, so that the reaching-behind section 21 of the plug 2 reaches behind the wall of the opening. For inserting the plug 2, the placing device 3 and the components connected therewith are held in a freely swinging manner, so that, by way of the swinging motion of the placing device 3, the plug 2 will independently position itself in the center with respect to the opening to be closed. As a result, the reaching-behind section 21 of the plug 2 securely reaches behind the wall of the opening. By means of the spindle drive 7, the plug 2 is finally pushed completely out of the plug magazine 4. During the subsequent removal of the placing device 3, the check takes place with respect to the secure holding of the plug in the opening by means of the above-described generating of tensile force.

For the refilling of the plug magazine 4, the latter can be exchanged or, by means of the placing device 3, a stack of plugs 2 can be put over or moved over the plug magazine. Here, the spindle drive 7 proceeds slowly analogous to the putting-over speed of the robot in the opposite direction, in order to prevent a wrong orientation of the plug 2 (twisting by 180 degrees in the magazine). The stack of plugs 2 is in this case preferably arranged in a guide.

With respect to its implementation, the invention is not limited to the above-indicated preferred embodiments. On the contrary, a number variants is conceivable which use the illustrated solution also in the case of implementations of basically different types. For example, different plug constructions are conceivable which are adapted to the corresponding openings and wall thicknesses.

The invention claimed is:

1. A robot tool for placing plugs in openings in a vehicle body component, comprising:
    a placing device having an outlet;
    a tubular plug magazine arranged on the placing device, the plug magazine being configured to hold a plurality of loose plugs arranged in a row directly behind one another in a longitudinal direction of the plug magazine, wherein
    the placing device is configured to place the plurality of plugs in the respective openings of the vehicle body component, without reloading after each individual plug placement of the plurality of plugs, by pushing each plug out of the outlet of the plug device in the longitudinal direction of the plug magazine.

2. The robot tool according to claim 1, wherein successively the robot tool is guidable according to human-robot-cooperation requirements, and the placing device is guidable to the respective openings in the vehicle body component.

3. The robot tool according to claim 1, further comprising:
    an electric spindle drive operatively configured to push the plurality of plugs out of the outlet of the plug magazine which is accommodated in the placing device in predefined steps.

4. The robot tool according to claim 3, wherein:
    a bending device of the placing device is arranged at the outlet, the bending device being configured to at least partially bend-over at least one elastic part of the plugs during the pushing-out of the plug from the placing device.

5. The robot tool according to claim 4, wherein the bending device is configured as a lip surrounding the outlet of the placing device.

6. The robot tool according to claim 4, wherein the bending device is configured as one or more projections molded onto the outlet of the placing device.

7. The robot tool according to claim 1, wherein:
    a bending device of the placing device is arranged at the outlet, the bending device being configured to at least partially bend-over at least one elastic part of the plugs during the pushing-out of the plug from the placing device.

8. The robot tool according to claim 1, wherein the placing device is exchangeable so that different plugs are placeable in correspondingly different openings in the vehicle body component.

* * * * *